US011021023B2

(12) United States Patent
Duncan et al.

(10) Patent No.: US 11,021,023 B2
(45) Date of Patent: Jun. 1, 2021

(54) RAPID TIRE INFLATION SYSTEM WITH AIR COMPRESSOR

(71) Applicant: Bridgestone Americas Tire Operations, LLC, Nashville, TN (US)

(72) Inventors: Anthony B. Duncan, Wadsworth, OH (US); Jon I. Stuckey, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 339 days.

(21) Appl. No.: 16/063,751

(22) PCT Filed: Dec. 6, 2016

(86) PCT No.: PCT/US2016/065143
§ 371 (c)(1),
(2) Date: Jun. 19, 2018

(87) PCT Pub. No.: WO2017/116631
PCT Pub. Date: Jul. 6, 2017

(65) Prior Publication Data
US 2020/0269640 A1   Aug. 27, 2020

Related U.S. Application Data

(60) Provisional application No. 62/272,144, filed on Dec. 29, 2015.

(51) Int. Cl.
*B60C 23/10* (2006.01)
*B60C 23/16* (2006.01)
*B60C 23/00* (2006.01)

(52) U.S. Cl.
CPC ............ *B60C 23/004* (2013.01); *B60C 23/10* (2013.01); *B60C 23/16* (2013.01); *B60C 2200/08* (2013.01)

(58) Field of Classification Search
CPC ....... B60C 23/004; B60C 23/16; B60C 23/10; B60C 23/121
See application file for complete search history.

(56) References Cited

U.S. PATENT DOCUMENTS

| 1,601,144 A | 9/1926 | Poole |
|---|---|---|
| 2,634,783 A | 4/1953 | Turek |

(Continued)

FOREIGN PATENT DOCUMENTS

| DE | 3308080 | 9/1984 |
|---|---|---|
| DE | 8715177 U1 | 1/1988 |

(Continued)

OTHER PUBLICATIONS

Machine translation of DE4010711A1 published on Oct. 17, 1991 owned by Homeyer Ulrich Von.

(Continued)

*Primary Examiner* — Kip T Kotter (57) ABSTRACT

An onboard inflation system for a vehicle such as an agricultural vehicle is disclosed, including a tire mounted on a wheel to form a wheel and tire assembly. The tire includes a tread portion and a tire cavity including an inflation chamber adjacent the tread portion of the tire. A storage chamber is carried by at least one of the wheel and the tire. A compressor arrangement is communicated with both the storage chamber and the inflation chamber. The compressor arrangement is configured to transfer air between the storage chamber and the inflation chamber.

32 Claims, 8 Drawing Sheets

(56) References Cited

U.S. PATENT DOCUMENTS

| | | | |
|---|---|---|---|
| 4,289,187 A * | 9/1981 | Rivin | B60C 23/16 138/30 |
| 4,470,506 A | 9/1984 | Goodell et al. | |
| 4,763,709 A | 8/1988 | Scholer | |
| 5,119,856 A | 6/1992 | Zarotti | |
| 5,313,995 A | 5/1994 | Schultz | |
| 5,452,753 A * | 9/1995 | Olney | B60C 23/004 152/417 |
| 5,553,647 A | 9/1996 | Jaksic | |
| 5,587,698 A | 12/1996 | Genna | |
| 5,629,874 A | 5/1997 | Mittal | |
| 5,647,927 A | 7/1997 | Mason | |
| 6,144,295 A | 11/2000 | Adams et al. | |
| 6,218,935 B1 | 4/2001 | Corcoran et al. | |
| 6,439,044 B1 | 8/2002 | Tigges | |
| 6,499,343 B1 | 12/2002 | Haas et al. | |
| 6,594,566 B1 | 7/2003 | Skoff | |
| 6,966,220 B2 | 11/2005 | Yueh | |
| 7,049,949 B2 | 5/2006 | Champeau | |
| 7,197,422 B2 | 3/2007 | Gaunt et al. | |
| 8,108,099 B2 | 1/2012 | Sawada et al. | |
| 8,744,679 B2 | 6/2014 | Boss et al. | |
| 8,783,314 B2 | 7/2014 | Tigges | |
| 8,955,566 B2 | 2/2015 | Loewe | |
| 8,967,182 B2 | 3/2015 | Tigges | |
| 9,126,460 B2 | 9/2015 | Knapke et al. | |
| 9,296,264 B2 | 3/2016 | Mozingo et al. | |
| 9,308,786 B2 | 4/2016 | Stoychev et al. | |
| 2003/0216845 A1 | 11/2003 | Williston | |
| 2003/0230342 A1 | 12/2003 | Skoff | |
| 2004/0003865 A1 | 1/2004 | Skoff | |
| 2005/0045259 A1 | 3/2005 | Hottebart | |
| 2005/0081973 A1 | 4/2005 | Marin-Martinod | |
| 2005/0102073 A1 | 5/2005 | Ingram | |
| 2005/0279160 A1 * | 12/2005 | Nordhoff | B60C 17/02 73/146 |
| 2006/0041396 A1 | 2/2006 | Polzin | |
| 2006/0278314 A1 | 12/2006 | Skoff | |
| 2007/0044881 A1 | 3/2007 | Skoff | |
| 2010/0314015 A1 | 12/2010 | Rodenbeck | |
| 2011/0120611 A1 | 5/2011 | Hansen | |
| 2011/0140875 A1 | 6/2011 | Be et al. | |
| 2012/0218095 A1 | 8/2012 | Zhou | |
| 2012/0221196 A1 | 8/2012 | Seymour et al. | |
| 2013/0030658 A1 | 1/2013 | Linster | |
| 2013/0061945 A1 | 3/2013 | Tigges | |
| 2013/0068361 A1 | 3/2013 | Flory et al. | |
| 2013/0112327 A1 | 5/2013 | Tigges | |
| 2014/0299215 A1 | 10/2014 | Moulik | |
| 2015/0068653 A1 | 3/2015 | Cis et al. | |
| 2015/0107742 A1 | 4/2015 | Knapke et al. | |
| 2015/0165846 A1 | 6/2015 | Sidders et al. | |
| 2015/0231937 A1 | 8/2015 | Holdrich et al. | |
| 2015/0258863 A1 | 9/2015 | Gillen | |
| 2016/0332486 A1 * | 11/2016 | Strashny | B60C 23/004 |
| 2017/0043623 A1 * | 2/2017 | Bowman | B60C 23/004 |

FOREIGN PATENT DOCUMENTS

| | | | |
|---|---|---|---|
| DE | 4010711 A1 | 10/1991 | |
| DE | 4014379 | 11/1991 | |
| DE | 199923070 | 2/2000 | |
| DE | 10202993 | 7/2003 | |
| DE | 19923070 | 7/2003 | |
| DE | 202010013162 U1 | 3/2012 | |
| EP | 0079588 A2 * | 5/1983 | B60C 9/26 |
| EP | 0621144 A1 | 10/1994 | |
| EP | 1435302 A1 | 7/2004 | |
| EP | 2058148 | 5/2009 | |
| EP | 2078624 | 7/2009 | |
| EP | 2196336 | 6/2010 | |
| EP | 2548747 | 1/2013 | |
| EP | 3132951 A1 | 2/2017 | |
| FR | 2957302 | 9/2011 | |
| GB | 694475 | 7/1953 | |
| GB | 2526301 A | 11/2015 | |
| JP | H01 156110 A | 6/1989 | |
| WO | 1989008031 | 9/1989 | |
| WO | 9309964 A1 | 5/1993 | |
| WO | 1998001310 | 1/1998 | |
| WO | 2008019824 | 2/2008 | |
| WO | 2008142679 A2 | 11/2008 | |
| WO | 2011001261 | 1/2011 | |
| WO | 2011084462 | 7/2011 | |
| WO | 2013037052 | 3/2013 | |
| WO | 2013114388 | 8/2013 | |
| WO | 2013178568 | 12/2013 | |
| WO | 2014074491 | 5/2014 | |
| WO | 2014082692 | 6/2014 | |
| WO | 2015113151 A1 | 8/2015 | |

OTHER PUBLICATIONS

Machine translation of DE202010013162U1 published on Mar. 22, 2012 owned by Temes Engineering Gmbh.

Machine translation of DE8715177U1 published on Jan. 7, 1988 owned by Kromer, Karl-Hans.

Willi Schork, Supplementary European Search Report, pp. 1-3, dated Jul. 10, 2019, European Patent Office, Munich, Germany.

Willi Schork, European Written Opinion, pp. 1-3, dated Jul. 10, 2019, European Patent Office, Munich, Germany.

Duncan, Anthony B., Bridgestone Americas Tire Operations LLC, "Air Storage System for Rapid Tire Inflation", U.S. Appl. No. 16/063,739.

Duncan, Anthony B., Bridgestone Americas Tire Operations LLC, "Air Distribution System for Rapid Tire Inflation", U.S. Appl. No. 16/063,747.

Schork, Willi, Extended European Search Report, dated Jul. 3, 2019, pp. 1-3, European Patent Office, Munich, Germany.

English machine translation of JPH01156110A published on Jun. 19, 1989 owned by Toyo Umpanki Co. Ltd.

Hwang, Chan Yoon, International Search Report and Written Opinion, dated Mar. 27, 2017, pp. 1-9, Korean Intellectual Property Office, Daejeon, South Korea.

Schork, Willi, Extended European Search Report, dated Jul. 23, 2019, pp. 1-5, European Patent Office, Munich, Germany.

English machine translation of EP1435302 published on Jul. 7, 2004 owned by Wabco GMBH & Co. OHG.

Lee, Chang Ho, International Search Report and Written Opinion, dated Mar. 20, 2017, pp. 1-17, Korean Intellectual Property Office, Daejeon, South Korea.

Machine translation of WO2013178568 filed on Dec. 5, 2013 owned by Ptg Reifendruckregelsysteme Gmbh.

Machine translation of DE19923070 filed on Jul. 31, 2003 owned by Continental AG.

Machine translation of DE10202993 filed on Jul. 31, 2003 owned by Continental AG.

Machine translation of EP2548747 filed on Jan. 23, 2013 owned by Man Truck & Bus AG.

Bjorn Lach, Strategies for Automatic Tyre Inflation Pressure Control, 1997, University of the Federal Armed Forces, Hamburg, Germany.

Machine translation of DE19923070 filed on Feb. 10, 2000 owned by Manfred Rennings.

Machine translation of DE3308080 filed on Sep. 20, 1984 owned by Robert Bosch GMBH.

Machine translation of DE4014379 filed on Nov. 14, 1991 owned by Bayerische Motoren Werke AG.

Machine translation of EP2058148 filed on May 13, 2009 owned by Klaus Muller.

Machine translation of EP2078624 filed on Jul. 15, 2009 owned by Robert Bosch GMBH.

Machine translation of FR2957302 filed on Sep. 16, 2001 owned by Herve Duplessy.

Machine translation of WO1989008031 filed on Sep. 8, 1989 owned by Sondertechnik Gesellschaft M.B.H.

(56) References Cited

OTHER PUBLICATIONS

Machine translation of WO2008019824 filed on Feb. 21, 2009 owned by Tsiberidis Konstantinos [DE].
Machine translation of WO2014082692 filed on Jun. 5, 2014 owned by Wabco GMBH [DE].
Anthony B. Duncan, U.S. Appl. No. 16/063,739, Air Storage System for Rapid Tire Inflation filed on Jun. 19, 2018, Bridgestone Americas Tire Operations LLC, United States.
Anthony B. Duncan, U.S. Appl. No. 16/063,747, Air Distribution System for Rapid Tire Inflation filed on Jun. 19, 2018, Bridgestone Americas Tire Operations LLC, United States.

* cited by examiner

RAPID TIRE INFLATION SYSTEM WITH AIR COMPRESSOR

BACKGROUND OF THE INVENTION

1. Field of the Invention

The present disclosure relates generally to a method and apparatus for adjusting air pressure within a tire. More particularly, the system provides for the rapid change between a field ready pressure and a road ready pressure for large agricultural tires when the agricultural vehicles on which the tires are used move from a field environment to a road environment and vice versa.

2. Description of the Prior Art

Large self-propelled agricultural equipment such as a tractor, combine harvester or high clearance sprayer spends most of its operational time in or around a cultivated field. As a result, the tires of the equipment are often adapted to address common concerns arising from using heavy machinery over a cultivated field. One of the common concerns is soil compaction. As large equipment travels over a given field, the soil beneath the equipment's tires will be compacted to increase in density. This soil compaction may be harmful to the production or yield of the field. As soil compaction increases, the yield will often decrease. In order to combat this problem, it is common for equipment operators to reduce the air pressure of the tires when the equipment is in the field. Experience has shown that a reduced tire air pressure can reduce the level of soil compaction in the field. As a result it can also increase the production and efficiency of the field.

While this reduced tire air pressure may be preferable in the field environment, an elevated tire pressure is still preferable when the equipment is traveling over a typical paved road. The elevated tire pressure allows each tire to roll more efficiently and achieve a higher maximum velocity. With many users being forced to transport their large agricultural equipment extended distances from one field to another, speed and efficiency during transport is important. However, the time needed to inflate or deflate a typical tire is often a hindrance to the ability to rapidly and efficiently move the agricultural equipment from the field environment to the road environment.

What is needed then is an improved tire inflation system addressing these concerns.

SUMMARY OF THE INVENTION

In one aspect of the disclosure an inflation system includes a wheel and a tire mounted on the wheel to form a wheel and tire assembly. The tire includes a tread portion and a tire cavity including an inflation chamber adjacent the tread portion of the tire. The system further includes a storage chamber carried by at least one of the wheel and the tire. A compressor arrangement is communicated with both the storage chamber and the inflation chamber. The compressor arrangement is configured to transfer air between the storage chamber and the inflation chamber.

In another aspect of the disclosure an onboard inflation system is provided for a vehicle having a plurality of wheels and tires. Each of the tires is mounted on one of the wheels to define a plurality of wheel and tire assemblies. The inflation system includes each of the tires having a tread portion and a tire cavity including an inflation chamber adjacent the tread portion of the tire. The system further includes a plurality of storage chambers, each storage chamber being carried by either the wheel or the tire of a respective one of the wheel and tire assemblies. The system further includes a plurality of compressors, each of the compressors communicating the storage chamber of a respective one of the wheel and tire assemblies with the inflation chamber of the respective one of the wheel and tire assemblies. Each compressor is configured to pump air between its respective storage chamber and its respective inflation chamber so that operating pressure in the inflation chamber can be changed by operation of the compressor.

In another embodiment of the disclosure a method of controlling inflation pressures of a plurality of tires mounted on a plurality of wheels of a vehicle is provided. Each of the tires is mounted on one of the wheels to define a plurality of wheel and tire assemblies. The method may comprise the steps of:
(a) providing each of the wheel and tire assemblies with a separate inflation system including an inflation chamber operatively located adjacent a tread portion of the tire, a storage chamber, and a compressor communicating the storage chamber with the inflation chamber;
(b) providing each of the inflation chambers with an initial inflation pressure greater than atmospheric pressure, and providing each of the storage chambers with an initial stored air pressure greater than atmospheric pressure; and
(c) selectively operating at least one of the compressors to increase pressure in one of its associated chambers by pumping air from the other of its associated chambers, thereby more rapidly providing the increased pressure than the same compressor could do if pumping additional air to said one of its associated chambers from an atmospheric pressure source.

In any of the embodiments the compressor arrangement may be configured to transfer air from the inflation chamber to the storage chamber so that operating pressure in the inflation chamber can be decreased by operation of the compressor arrangement.

In any of the embodiments a valve may be communicated with the storage chamber and the inflation chamber, so that the valve can be opened to allow air to flow from the storage chamber to the inflation chamber, the valve being located in parallel with the compressor arrangement.

In any of the embodiments the storage chamber and the inflation chamber may define a closed air storage system wherein operating pressure in the inflation chamber can be increased without adding air to the closed air storage system and decreased without discharging air from the closed air storage system.

In any of the embodiments the compressor arrangement may include a two-way compressor configured to transfer air from the storage chamber to the inflation chamber, and to transfer air from the inflation chamber to the storage chamber, so that operating pressure in the inflation chamber can be selectively increased or decreased by operation of the two-way compressor.

In any of the above embodiments the storage chamber may be located inside the tire cavity, and the system may include a divider wall separating the inflation chamber and the storage chamber.

In any of the above embodiments the divider wall may be substantially rigid so that volumes of the storage chamber and the inflation chamber of each wheel and tire assembly remain substantially constant with changing operating pressure in the associated inflation chamber.

In any of the above embodiments the compressor arrangement may be mounted on the divider wall.

In any of the above embodiments the storage chamber may be carried by the wheel outside the cavity of the tire.

In any of the above embodiments the compressor arrangement may be carried by the wheel outside the cavity of the tire.

In those embodiments having a plurality of wheel and tire assemblies, each compressor arrangement may be independently operable to control inflation of its respective wheel and tire assembly.

In any of the above embodiments a controller may be provided and configured to repeatedly change the operating pressure in each of the inflation chambers between a lower pressure and a higher pressure by transfer therebetween the storage chamber and the inflation chamber.

Numerous objects features and advantages of the invention will be readily apparent to those skilled in the art upon a reading of the following disclosure in connection with the accompanying drawings.

DETAILED DESCRIPTION OF THE INVENTION

Definitions

Following are definitions of selected terms employed herein. The definitions include various examples and/or forms of components that fall within the scope of a term and that may be used for implementation. The examples are not intended to be limiting. Both singular and plural forms of terms may be within the definitions.

"Air" is understood to mean any inflating fluid suitable for use within a tire, including, but not limited to, gases containing some amount of nitrogen or oxygen. Consequently, "air pressure" is understood to mean the fluid pressure caused at least partially by the "air" contained within a body.

"Signal" may include any meaning as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire. The term "when" is used to specify orientation for relative positions of components, not as a temporal limitation of the claims or apparatus described and claimed herein unless otherwise specified.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Description

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
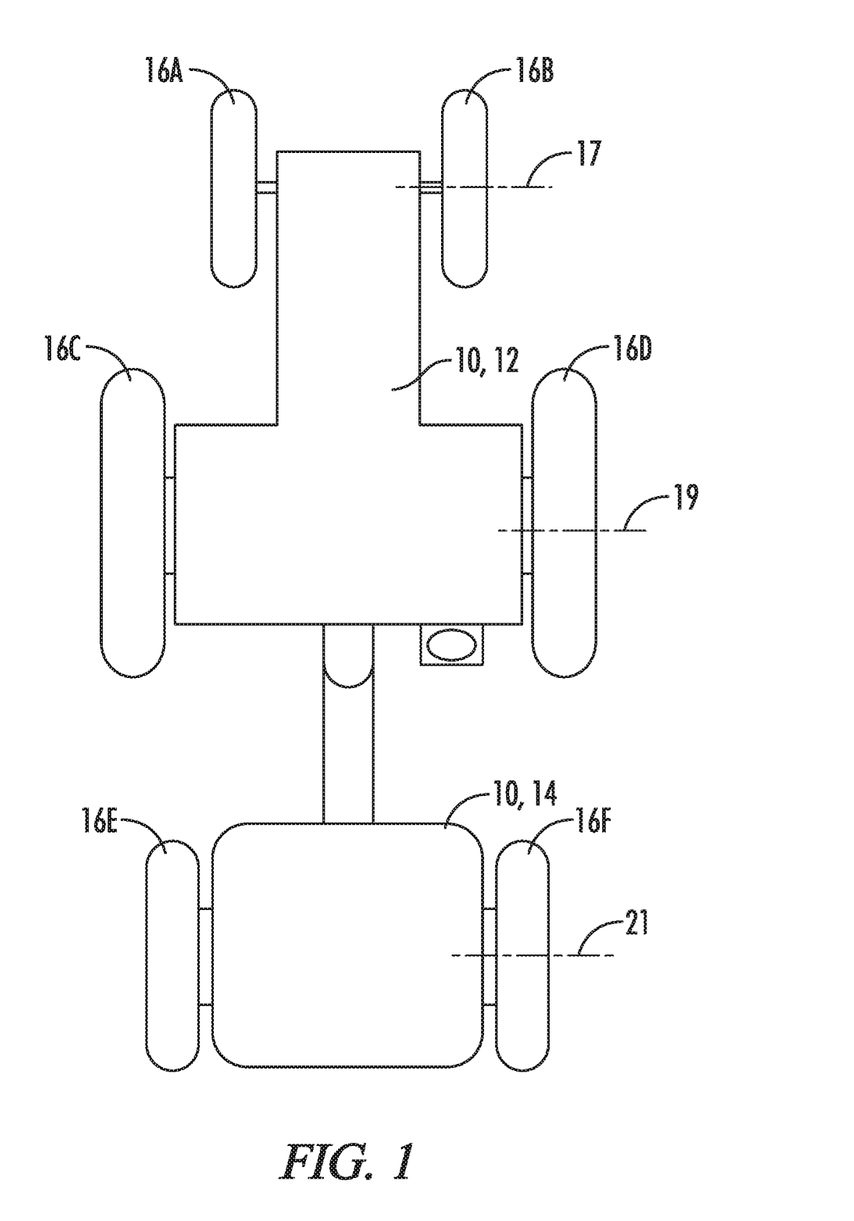
FIG. 1 is a schematic plan view of an agricultural vehicle including a tractor and an implement pulled by the tractor.
Figure 2:
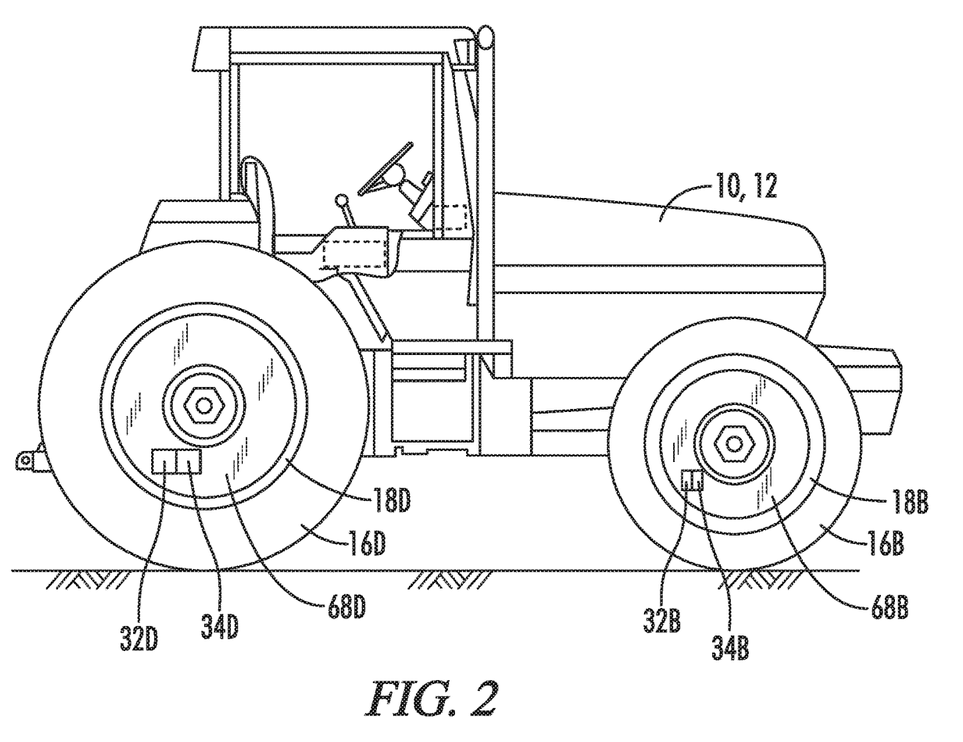
FIG. 2 is a schematic side elevation view of the tractor of FIG. 1.

Referring now to FIGS. 1 and 2, a vehicle 10 is shown which may include a tractor 12 and a trailer 14. The trailer 14 may be a trailer for hauling goods, or it may be another agricultural implement including but not limited to free wheeling agricultural implements such as corn planters, tillage equipment, disk implements, field cultivators, air seeders and the like.

The tractor 12 includes first and second front tires 16A and 16B associated with the front axle 17, and first and second rear tires 16C and 16D located with the rear axle 19. The trailer may include first and second trailer tires 16E and 16F associated with a trailer axle 21. It will be understood that the vehicle 10 may include other arrangements and may include more than the 6 tires shown or less. Each of the tires such as 16A is mounted on an associated wheel 18 such as the wheel 18A seen in FIG. 3. Each of the tires such as 16A and its associated wheel such as 18A may be described as a wheel and tire assembly.

Figure 3:
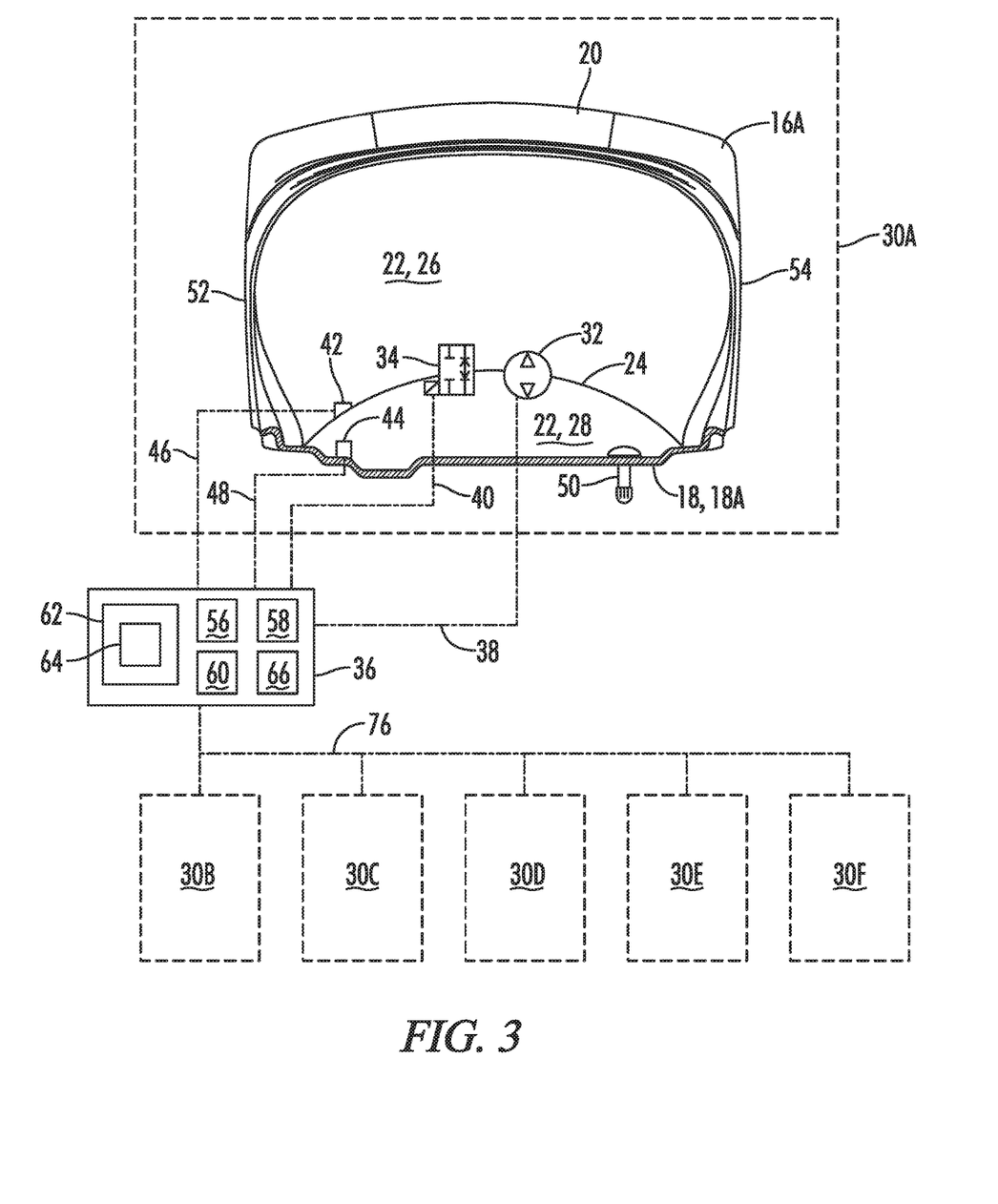
FIG. 3 is schematic drawing of one wheel and tire assembly in cross section, with an internal storage chamber and inflation chamber, with parallel valve and compressor arrangement between the chambers. A controller is schematically shown, as are a plurality of further wheel and tire assemblies of the vehicle of FIG. 1.

As best seen in FIG. 3, wherein a schematic cross-section is shown through a portion of the tire 16A and associated wheel 18A, includes a tread portion such as 20 and a tire cavity such as 22. In the embodiment shown in FIG. 3, a divider wall 24 separates the tire cavity 22 into an inflation chamber 26 and a storage chamber 28.

The inflation chamber 26 and the storage chamber 28 may also be alternatively referred to as an upper chamber 26 and a lower chamber 28. The inflation chamber 26 may be described as being between the tread portion 20 of the tire and the divider wall 24. The storage chamber 28 can be described as being between the divider wall 24 and the wheel 18A. The wheel and tire assembly 18A, 16A may be described as being associated with or as being part of an inflation system generally designated by the numeral 30A the components of which are located within the dashed box 30A indicated in FIG. 3.

The inflation system may include a compressor arrangement 32 communicated with both the storage chamber 28 and the inflation chamber 26. The compressor arrangement 32 is configured to transfer air between the storage chamber 28 and the inflation chamber 26.

In FIG. 3, the compressor arrangement 32 is schematically illustrated as being a bidirectional compressor which may either pump air from the storage chamber 28 into the inflation chamber 26 or from the inflation chamber 26 into the storage chamber 28. Alternatively, the compressor arrangement 32 may include two parallel unidirectional compressors, one of which is arranged to pump air from the inflation chamber 26 into the storage chamber 28 and the other of which is arranged to pump air from the storage chamber 28 into the inflation chamber 26. A further alternative may have the compressor arrangement 32 including only a single unidirectional compressor which may in one arrangement provide for the pumping air from the storage chamber 28 to the inflation chamber 26. In another embodiment a unidirectional compressor may be arranged to pump air from the inflation chamber 26 into the storage chamber 28.

The inflation system 30A may further include a valve 34 mounted in the divider wall 24 and communicated with the storage chamber 28 and the inflation chamber 26, and arranged parallel to the compressor 32. The valve 34 can be moved between an open position allowing communication between chambers 26 and 28, and a closed position.

Both the compressor 32 and the valve 34 are automatically controlled components which are associated with a controller 36. The controller 36 sends control signals to compressor 32 over communication line 38, and to valve 34 over communication line 40.

The inflation system 30A further includes first and second pressure sensors 42 and 44. The first pressure sensor 42 is arranged to be communicated with the inflation chamber 26, and the second pressure sensor 44 is arranged to be communicated with the storage chamber 28.

The first pressure sensor 42 is shown being located on an upper surface of divider wall 24, but it will be understood that the first pressure sensor 42 may be placed at any location so long as it is in communication with the inflation chamber 26. The first pressure sensor 42 may be physically mounted on the divider wall 24, on the tire 16A, or on the wheel 18A.

Similarly, the second pressure sensor 44 is shown as mounted on the wheel 18A, but it will be understood that it can be located in any way so long as it is in pressure communication with the storage chamber 28.

Pressure signals from the first sensor 42 and second pressure sensor 44 may be communicated to the controller 36 via communication lines 46 and 48.

It is noted that all of the communication lines 38, 40, 46 and 48 may be hard wired, or may comprise wireless communication paths between the controller 36 and the various associated components. Also each of the other wheel and tire assemblies have inflation systems 30B-30F associated therewith as schematically shown in FIG. 3. Controller 36 communicates with the inflation systems 30B-30F via communication lines schematically and collectively indicated as 76 in FIG. 3. It will be understood that each of the inflation systems 30B-30F may include all of the same features as illustrated for inflation system 30A.

The inflation chamber 26 and storage chamber 28 collectively may be described as a closed air storage system wherein operating pressure in the inflation chamber 26 can be increased without adding air to the closed air storage system and decreased without discharging air from the closed air storage system. It is noted that a conventional valve stem 50 may be mounted in the wheel 18A so that air can be added to or discharged from the closed air system, but in normal operation of the tire the valve stem 50 is closed and thus the air storage system within the tire 16A is closed.

Divider Wall Construction

Figure 3A:
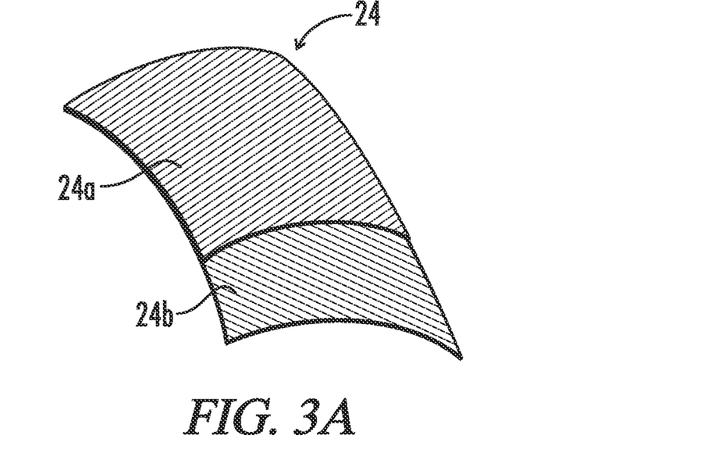
FIG. 3A is a schematic drawing of a divider wall of FIG. 3 showing an exemplary embodiment where the divider wall comprises two plies of rubber coated parallel cords.

The structural construction of the divider wall 24 may take many different forms. For example, in the embodiment shown in FIG. 3, the divider wall 24 is an annular sheet-like member that extends axially between first and second sidewalls 52 and 54 of the tire 16A. The divider wall 24 may be integrally attached to the sidewalls 52 and 54 of the tire 16A. Alternatively, the divider wall may be a portion of a toroidal bladder which encloses the storage chamber 28. As schematically shown in FIG. 3A, any of the embodiments of the divider wall may have the divider wall 24 constructed of one or more plies 24a, 24b of rubber coated parallel cords. If multiple layers are utilized, the plies 24a, 24b are preferably oriented in the manner of bias plies with cords of alternating layers running in alternate directions. Additionally, the divider wall 24 may be made of any other suitable materials.

Additionally, it is noted that the divider wall 24 may be constructed in a sufficiently rigid manner that the divider wall serves as a structural member which biases the first and second sidewalls 52 and 54 of the tire 16A axially outward away from each other so as to aid in maintaining the seal of the bead portions of the sidewalls on the wheel 18A. The divider wall 24 may also provide a run-flat function. The divider wall 24 may be substantially rigid so that the volume of storage chamber 28 is substantially constant.

The Controller

Controller 36 includes a processor 56, a computer readable memory medium 58, a data base 60 and an input/output module or control panel 62 having a display 64.

The term "computer-readable memory medium" as used herein may refer to any non-transitory medium 58 alone or as one of a plurality of non-transitory memory media 58 within which is embodied a computer program product 66 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 36 receives input data from the sensors 42 and 44. Based upon the programming 66 the controller 36 sends command signals to compressor 32 and valve 34 to control air pressure in the chambers 26 and 28 as is further described below.

In FIG. 2 an alternative embodiment is schematically illustrated in which external storage chambers such as 68B and 68D are carried on or mounted on their associated wheels 18B and 18D, and having associated therewith compressors 32B and 32D and valves 34B and 34D also carried by their respective wheels outside of the cavity of their associated tires. Storage chambers 68B and 68D as shown in FIG. 2 may be pancake shaped and mounted on their respective wheels to rotate with the wheels. The storage chambers 68B and 68D are communicated with their respective tire cavities with suitable conduits and connections through the wheel walls. The associated compressors 32B and 32D and valves 34B and 34D may be mounted on the outside of the pancake shaped chambers or at any other suitable location carried by the wheels.

It is noted that for all of the above embodiments, the compressors 32 and valves 34 may be electrically powered via batteries. Also, the compressors and valves may be powered by hydraulic or pneumatic power, or by hard wired electrical power, communicated to the compressors and valves via suitable rotating connections from a power source located elsewhere on the vehicle 10.

Figure 4A:
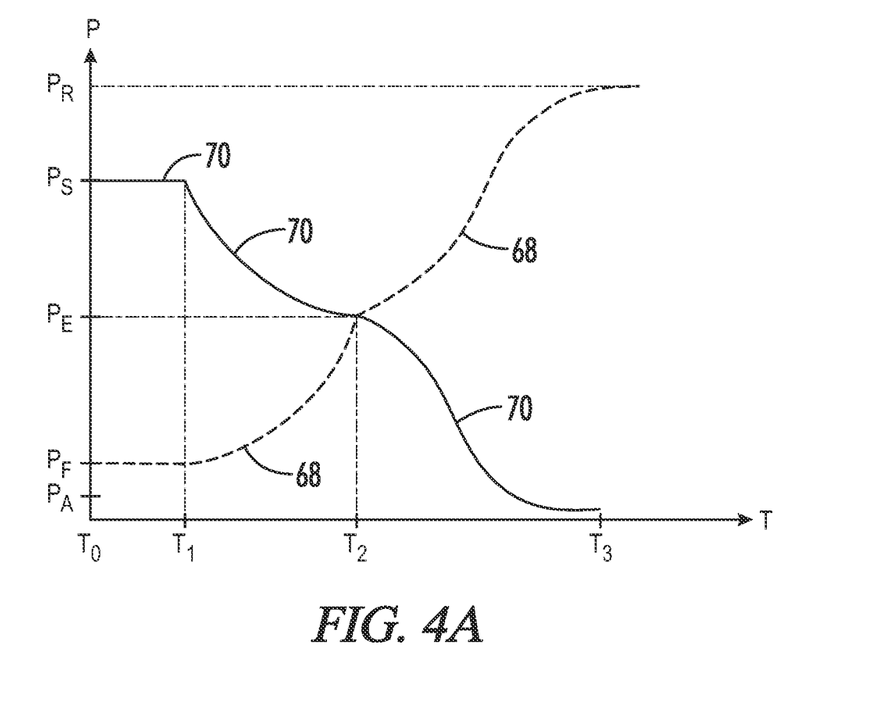
FIG. 4A is a graphical depiction of pressure versus time for a combined valve and compressor arrangement of a closed air system as in FIG. 3, as the inflation pressure in the tire is increased from a lower pressure to a higher pressure.
Figure 4B:
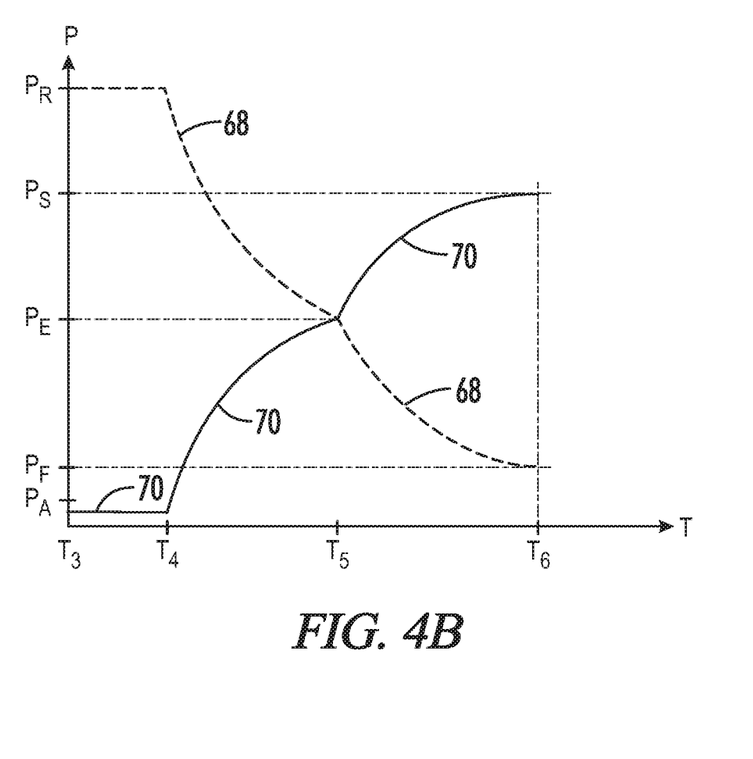
FIG. 4B is a continuation of the graphical depiction of FIG. 4A, at later times when the inflation pressure in the tire is decreased from the higher pressure to the lower pressure.

Example of FIGS. 4A-4B

FIGS. 4A-4B graphically depict one mode of operation of the system shown for example in FIG. 3. In FIGS. 4A and 4B, the operating pressure in the inflation chamber 26 is depicted by dashed line curve 68. The pressure in the storage chamber 28 is depicted by the solid line curve 70. The horizontal axis represents time and the vertical axis represents pressure.

In the scenario illustrated in FIG. 4A, at a starting time $T_0$ the inflation pressure 68 is initially at a value $P_F$, which in one example may be a field ready inflation pressure. The storage pressure 70 in storage chamber 28 is initially at a level $P_S$. Both the pressure $P_F$ and $P_S$ are greater than atmospheric pressure which is represented by the value $P_A$.

In the scenario illustrated in FIG. 4A, both the valve 34 and the compressor 32 will be utilized. Initially, the valve 34 is closed and the compressor 32 is inoperative. At time $T_1$, the valve 34 is opened, thus allowing the pressure within the storage chamber 28 and the inflation chamber 26 to rapidly equalize to a pressure $P_E$ at time $T_2$. At time $T_2$, the valve 34 is closed and the compressor 32 is actuated to pump additional air from the storage chamber 28 to the inflation chamber 26 thus causing the inflation pressure 68 in inflation chamber 26 to continue to rise until it ultimately reaches a higher inflation pressure which in this example may be a road ready pressure $P_R$ at time $T_3$. During this same interval from time $T_2$ to time $T_3$, the pressure 70 in storage chamber 28 continues to drop and may go below $P_A$ or to whatever the minimum pressure is that the compressor 32 is capable of drawing.

Thus through the combined operation of the valve 34 and the compressor 32, the inflation pressure 68 in inflation chamber 26 has been increased from a lower field ready pressure $P_F$ to a higher road ready pressure $P_R$. Because the compressor 32 is pulling air from storage chamber 28 at an equilibrium pressure $P_E$ when the compressor turns on at time $T_2$, the compressor 32 can much more rapidly increase the air pressure in inflation chamber 26, than it could if it were taking its low pressure air from an atmospheric pressure source.

The operations just described with regard to FIG. 4A may be performed by the controller 36 in an automatic manner in response to an operator input instruction to control panel 62 by the human operator driving the vehicle 10.

Thus at time $T_3$ shown in FIG. 4A the inflation pressure curve 68 has reached the level $P_R$.

Turning now to FIG. 4B, a subsequent reduction of the inflation pressure in inflation chamber 26 from the road ready level $P_R$ to the field ready level $P_F$ is illustrated. Thus as seen in FIG. 4B, at time $T_3$, the vehicle 10 is in the status wherein the inflation chamber 26 is at pressure $P_R$ and the pressure in storage chamber 28 is at some minimum level which may in fact be below the level $P_F$.

At time $T_4$, the operations to reduce the inflation pressure from the road ready level $P_R$ back to the field ready pressure $P_F$ is illustrated. At time $T_4$ the valve 34 is opened allowing the pressure within inflation chamber 26 and storage chamber 28 to again equalize at the value $P_E$ which occurs relatively quickly at a time $T_5$. Then at time $T_5$, the valve 34 is closed and the compressor 32 is activated to operate in the opposite direction so as to pump air from the inflation chamber 26 into the storage chamber 28. This reduces the pressure in inflation chamber 26 as shown by the dashed line curve 68 between time $T_5$ and $T_6$ until the pressure 68 in inflation chamber 26 reaches the desired field ready pressure $P_F$ at which time the compressor 32 is deactivated.

Thus in the cycle represented by FIGS. 4A and 4B combined, the closed air storage system including the inflation chamber 26 and the storage chamber 28 has been utilized along with the compressor 32 and the valve 34 so as to increase the pressure from the lower field ready pressure $P_F$ at time $T_1$ to the higher road ready pressure $P_4$ at time $T_3$, and then later at time $T_4$ to reduce the inflation pressure from the road ready level $P_R$ back to the lower field ready pressure $P_F$ which is achieved at time $T_6$.

In one example of the scenario depicted in FIGS. 4A and 4B, if the inflation chamber 26 and storage chamber 28 have equal volumes, and if the inflation chamber is initially charged at a field ready pressure of 10 psi and the storage chamber is initially charged at a storage pressure of 30 psi, upon opening of valve 34 the pressure in both chambers will equalize at 20 psi. Then the compressor 32 may be used to boost the pressure in inflation chamber 26 to for example a road ready inflation pressure of 25 psi. This will reduce the pressure in storage chamber 28 to about 15 psi.

Figure 5A:
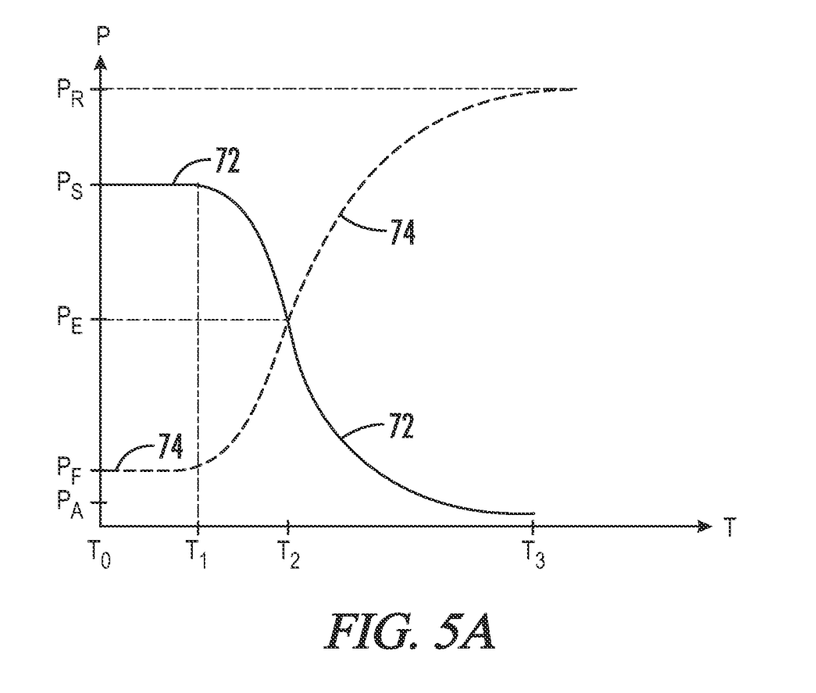
FIG. 5A is a graphical depiction of pressure versus time for the compressor arrangement acting without the parallel valve, as the inflation pressure in the tire is increased from a lower pressure to a higher pressure.
Figure 5B:
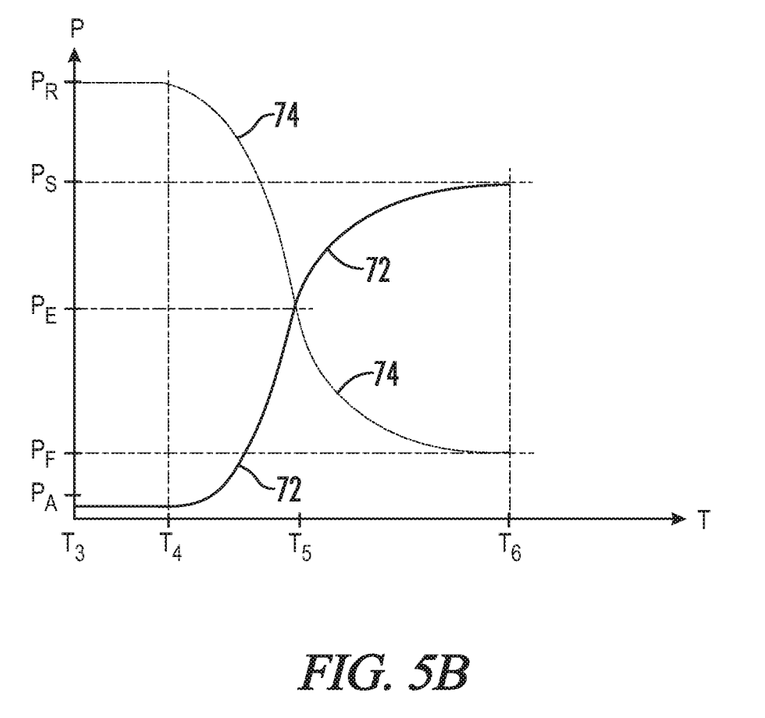
FIG. 5B is a continuation of the graphical depiction of FIG. 5A, at later times when the inflation pressure in the tire is decreased by action of the compressor from the higher pressure to the lower pressure.

Example of FIGS. 5A-5B

FIGS. 5A-5B illustrate the operation of a system like that shown in FIG. 3, except in this example the valve 34 will not be used. The bi-directional compressor 32 will be used as the sole conduit for transfer of air between the chambers 26 and 28.

Thus in FIGS. 5A-5B, the pressure within the air storage chamber 28 is represented by solid line curve 72 and the pressure within inflation chamber 26 is represented by the dash line curve 74.

In FIG. 5A, at time $T_0$ the initial inflation pressure in inflation chamber 26 is at the lower field ready level $P_F$, and the storage pressure in air storage chamber 28 is at level $P_S$. At time $T_1$, the bi-directional compressor 32 is activated to pump air from the storage chamber 28 to the inflation chamber 26 so as to raise the pressure in inflation chamber 26 to the higher road ready level $P_R$. At some point during the process represented at time $T_2$ the curves 72 and 74 cross at equilibrium pressure $P_E$. Then the pressure in inflation chamber 26 increases and the pressure in air storage chamber 28 is drawn down to some minimum pressure which may or may not be below atmospheric pressure $P_4$. This is represented at time $T_3$ in FIG. 5A. Thus at time $T_3$, the inflation pressure in the tires 26 is at a road ready inflation pressure $P_R$.

The process continues as shown in FIG. 5B wherein at time $T_4$ it is determined to reduce the pressure in the tire from the higher road ready $P_R$ to the lower field ready level $P_F$. The bi-directional compressor 32A is activated at time $T_4$ to pump air from the inflation chamber 26 into the air storage chamber 28, thus reducing the inflation pressure as represented by dash curve 74 to the lower field ready pressure $P_F$ and returning the pressure in storage chamber 28 to the level $P_S$ as represented by solid line curve 72, which final state is achieved at time $T_6$.

Thus during this process the inflation pressure in inflation chamber 26 may be repeatedly changed between its lower field ready level $P_F$ and its higher road ready pressure $P_R$ without adding air to or discharging from the closed air storage system defined by the inflation chamber 26 and the air storage chamber 28.

Although the processes described above have been described with regard to one of the tires 16 and its associated inflation system 30A, as schematically illustrated in FIG. 3, the controller 36 communicates with each of the inflation systems 30B-30F associated with the other tires 16B-16F of the vehicle 10, and the controller 36 may control each tire individually or any selected combination of tires simultaneously as desired.

Figure 6:
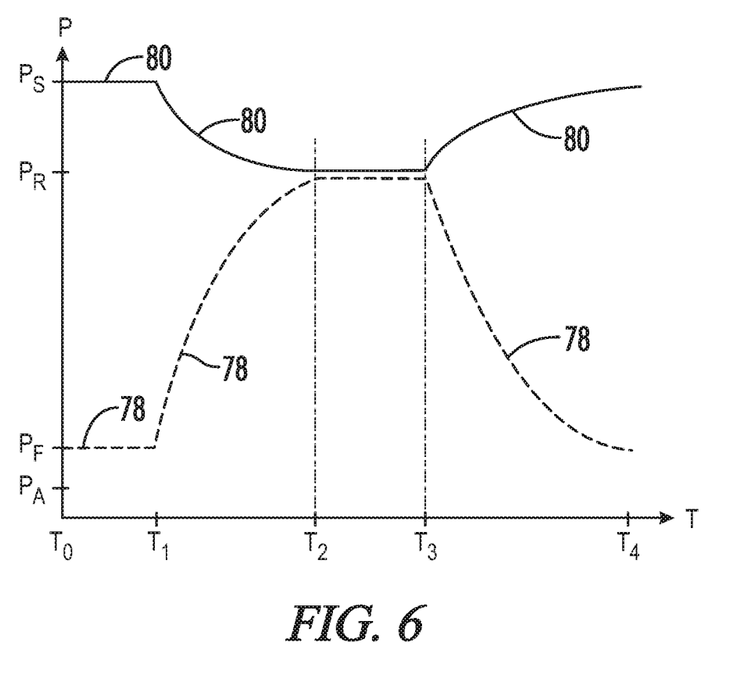
FIG. 6 is a graphical depiction of pressure versus time for a system starting with a storage pressure higher than the high inflation pressure, then opening a valve to equalize the system to the high inflation pressure, then later using the compressor to transfer air from the inflation chamber back to the storage chamber.

Example of FIG. 6

FIG. 6 illustrates another manner in which the inflation system 30 of FIG. 3 may be used. In this example, the inflation pressure in inflation chamber 26 is represented by dash line curve 78 and the storage pressure in storage chamber 28 is represented by solid line curve 80.

In this example, sufficient compressed air is provided in the air storage chamber 28 so that upon opening of the valve 34 and equalizing of the pressure in the inflation chamber 26 and storage chamber 28, the equilibrium pressure will be at the desired higher road ready level $P_R$. Thus in the example of FIG. 6, at time $T_0$, the initial pressure stored in air storage chamber 28 is at a level $P_S$ which is higher than the desired road ready inflation pressure $P_R$. The initial pressure in inflation chamber 26 is at the level $P_F$ which is the lower field ready pressure.

At time $T_1$, the valve 34 is opened allowing the pressure within inflation chamber 26 and storage chamber 28 to equalize at the level $P_R$ which will be the road ready inflation pressure at which the tire is desired to be operated. Thus between time $T_1$ and $T_2$ the inflation pressure represented by dash curve 78 will relatively rapidly increase, depending on the flow capacity of the valve 34 to reach the level $P_R$.

Between times $T_2$ and $T_3$, vehicle 10 has its tire inflated to the higher road ready inflation level $P_R$ and may by operated on the roads. When it is desired to return the inflation pressure to the lower field ready pressure $P_F$, at a time as indicated at $T_3$, the valve 34 is closed and the compressor 32 can be activated to pump air from the inflation chamber 26 back into the storage chamber 28 thus increasing the storage pressure from valve $P_R$ to $P_S$ as represented by the solid line curve 80 between times $T_3$ and $T_4$. During that same interval, the inflation pressure represented by dash line curve 78 between times $T_3$ and $T_4$ will decrease from the higher road ready pressure $P_R$ to the lower field ready pressure $P_F$.

Once again, the air storage system defined by inflation chamber 26 and air storage chamber 28 may be described as a closed air storage system, and the inflation pressure may be repeatedly changed between the lower field ready pressure $P_F$ and the higher road ready pressure $P_R$ by repeating the process illustrated in FIG. 6 without adding any air to the closed air storage system or discharging any air from the closed air storage system.

It is also noted that if the system is to be operated in the manner as shown in FIG. 6, the bi-directional compressor schematically illustrated in FIG. 3 could be replaced by a unidirectional air compressor which only pumps air from the inflation chamber 26 back in to the storage chamber 28.

In the scenario illustrated in FIG. 6, it will also be understood that the inflation system may be designed and controlled such the desired road ready pressure $P_R$ in the inflation chamber 26 will be achieved before an equilibrium condition between the inflation chamber 26 and air storage chamber 28 is achieved. In that case, the valve 34 will be closed at a point in time when the remaining pressure in the air storage chamber 28 is still in excess of the road ready pressure $P_R$.

Several numerical examples are provided below to illustrate typical pressures and chamber volumes which could achieve the scenario of FIG. 6. In the examples below the assumption is that when it is desired to increase the pressure in the inflation chamber 26 from the field ready pressure $P_F$ to a road ready pressure $P_R$, the valve 34 will be opened and the pressure within the cavities 26 and 28 will be allowed to equalize.

The pressure relationship between the pressure $P_F$ in the inflation chamber 26 having a volume $V_f$, and the pressure $P_x$ in the storage chamber 28 having a volume $V_x$ may be described as follows. It is noted that the pressure $P_x$ in the storage chamber 28 is analogous to the storage pressure $P_S$ discussed above. The relationship is:

$$P_F \times V_f + P_x \times V_x = P_R \times V_r$$

wherein $V_r = V_f + V_x$.

The volumes $V_f$ and $V_x$ are determined by the construction of the tire 16 and wheel 18 and the construction of the divider wall 24 which determines the subsequent volumes into which the volume of the cavity 22 is divided. Thus the volumes $V_f$ and $V_x$ are determined by the construction of the divider wall 24. For a selected volume $V_x$ which may be described as a percentage of the total volume $V_r$, then given any assumed desired field ready pressure $P_F$ and road ready pressure $P_R$, the necessary pre-charged pressure $P_x$ for the storage chamber 28 may be calculated by the formula:

$$P_x = \frac{P_R \times V_r - P_F \times V_f}{V_r - V_f}$$

Several examples of tire sizes and applicable field ready pressures and road ready pressures for which the inflation system 30A is designed may include the following:

TABLE I

| Tire Size | Field Ready Pressure $P_F$ (PSI) | Road Ready Pressure $P_R$ (PSI) |
|---|---|---|
| 480/80R50 | 12-14 | 35 |
| 480/80R46 | 12-14 | 35 |
| 710/70R42 | 6 | 29 |
| 800/70R38 | 6 | 23 |

Choosing the tire size 800/70R38 from Table I, the cavity 22 of such a tire has a total volume of 85,500 cubic inches. For such an 800/70R38 tire, and for various selections of the construction of divider wall 24 so as to define the volume $V_x$ of the storage chamber 28 as a percentage of the total volume $V_r$ of cavity 22, the relative magnitudes of the necessary reservoir pressure $P_x$ within the chamber volume $V_x$ in order to inflate from a field pressure $P_F$ of 6 psi to a road ready pressure $P_R$ of 23 psi, are shown in the following Table II:

TABLE II

| (800/70R38) $V_r = 85,500$ in$^3$, $P_F = 6$ psi, $P_R = 23$ psi | | |
|---|---|---|
| $V_x$ | % $V_r$ | $P_x$ |
| 8550 | 10% | 176 |
| 17100 | 20% | 91 |
| 25650 | 30% | 63 |
| 34200 | 40% | 49 |
| 42750 | 50% | 40 |

Another factor which must be considered in the design of the divider wall 24, is the height of the divider wall 24 above the wheel 18, which inversely determines the clearance between the divider wall 24 and the tread portion 20 of the tire 16. It will be understood that when operating the tire 16 in a field ready mode at very low inflation pressures there will be substantial deflection of the tread area 20 toward the wheel 18, and the divider wall 24 should be designed such that the tread portion 20 does not contact the divider wall 24. The amount of permissible deflection of any given tire will vary and will need to be considered when designing the appropriate inflation system 30A for that tire and when selecting inflation pressures and reservoir pressures to be utilized.

Additionally, safety and operational considerations may place upper limits on the desired pressures within the storage chamber 28. In general it is preferred that the pre-charged pressure $P_x$ in the storage chamber 28 be no greater than about 100 psi.

Taking these factors into consideration, one suitable design of the inflation system 30A for a size 800/70R38 tire having a cavity volume of approximately 85,500 cubic inches is to design the divider wall 24 such that the volume $V_x$ of the storage chamber 28 is approximately 23,900 cubic inches which is approximately 28% of the total volume of the cavity 22. For such a volume $V_x$, the necessary pre-charged pressure $P_x$ is approximately 67 psi. Beginning with a field ready pressure $P_F$ in the inflation chamber 26 of 6 psi, and a reservoir pressure $P_x$ in the storage chamber 28 of 67 psi, upon opening of the valve 34 and allowing the pressure to equalize between chambers 26 and 28, the resulting equilibrium pressure $P_R$ in the inflation chamber 26 and storage chamber 28 will be approximately 23 psi which is the desired road ready pressure for the tire size in question.

The preferred field ready pressures and road ready pressures for the four tire sizes shown in Table I may be described as a field ready pressure that is in a range of from 20% to 50% of the road ready pressure, and more preferably wherein the field ready pressure is in a range of from 25% to 40% of the road ready pressure.

For the example set forth in the above Table II, the system 30A may be described as having the wheel 18, the tire 16 and the divider wall 24 configured such that the inflation chamber volume $V_x$ is in a range of from 20% to 40% of the total volume of the cavity 22, which would result in a pre-charged pressure in the range of from 49 psi to 91 psi.

Methods of Operation

Each of the scenarios illustrated above with regard to FIGS. 4-6, and others described herein, may be described as a method of controlling inflation pressures of a plurality of tires 16 mounted on a plurality of wheels 18 of a vehicle 10, with each of the tires 16 being mounted on one of the wheels 18 to define a plurality of wheel and tire assemblies. The method may be described as including steps of:

(a) Providing each of the wheel and tire assemblies with a separate inflation system 30 including an inflation chamber 26 operatively located adjacent a tread portion 20 of the tire 16, a storage chamber 28, and a compressor 32 communicating the storage chamber 28 with the inflation chamber 26;

(b) Providing each of the inflation chambers 26 with an initial inflation pressure greater than atmospheric pressure, and providing each of the storage chambers 28 with an initial stored air pressure greater than atmospheric pressure; and (c) Selectively operating at least one of the compressors 32 to increase pressure in one of its associated chambers 26 and 28, thereby more rapidly providing the increased pressure than the same compressor 32 could do if pumping additional air to said one of its associated chambers from an atmospheric pressure source.

In one embodiment of the method, in step (c) the pressure may be increased in the associated storage chamber 28 by pumping air from the associated inflation chamber 26.

The method may further include the step of selectively opening at least one of the valves 32 to allow air to flow from the associated storage chamber to the associated inflation chamber to increase inflation pressure in the inflation chamber.

In another mode of the invention, in step (c) the pressure may be increased in the associated inflation chamber by pumping air from the associated storage chamber.

In another mode of the invention, the storage chamber and the inflation chamber of each wheel and tire assembly may define a closed air storage system, and the method may include steps of selectively performing the functions of either increasing operating pressure in a selected one of the inflation chambers 26 without adding air to the associated closed air storage system, or decreasing operating pressure in the selected one of the inflation chambers 26 without discharging air from the associated closed air storage system.

All of the functions described above may be performed by an automatic controller 36 in response to operator input via the control panel 62.

Although the examples set forth herein have been described in the context of changing inflation pressure in the tires of an agricultural vehicle between a lower field ready pressure $P_F$ and a higher road ready pressure $P_R$, it will be understood that these are only examples, and that the system described herein may be utilized in any situation where there is a need for periodically increasing and/or decreasing the inflation pressure of the tires of the vehicle.

Thus it is seen that the methods and apparatus of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention, as defined by the appended claims.

What is claimed is:

1. An inflation system, comprising:
   a wheel;
   a tire mounted on the wheel to form a wheel and tire assembly, the tire including first and second sidewalls extending from the wheel, a tread portion, and a tire cavity including an inflation chamber adjacent the tread portion of the tire between the first and second sidewalls;
   a storage chamber carried by at least one of the wheel and the tire;
   a divider wall separating the inflation chamber and the storage chamber, the divider wall extending between the first and second sidewalls of the tire such that the divider interfaces with the first and second sidewalls; and
   a compressor arrangement communicated with both the storage chamber and the inflation chamber, the compressor arrangement configured to transfer air between the storage chamber and the inflation chamber.

2. The system of claim 1, wherein:
   the compressor arrangement is configured to transfer air from the inflation chamber to the storage chamber so that operating pressure in the inflation chamber can be decreased by operation of the compressor arrangement.

3. The system of claim 2, further comprising:
   a valve communicated with the storage chamber and the inflation chamber, so that the valve can be opened to allow air to flow from the storage chamber to the inflation chamber, the valve being located in parallel with the compressor arrangement.

4. The system of claim 3, wherein:
   the storage chamber and the inflation chamber define a closed air storage system wherein operating pressure in the inflation chamber can be increased without adding air to the closed air storage system and decreased without discharging air from the closed air storage system.

5. The system of claim 1, wherein:
   the compressor arrangement is a two way compressor arrangement configured to transfer air from the storage chamber to the inflation chamber, and to transfer air from the inflation chamber to the storage chamber, so that operating pressure in the inflation chamber can be selectively increased or decreased by operation of the two way compressor arrangement.

6. The system of claim 5, further comprising:
   a valve communicated with the storage chamber and the inflation chamber, so that the valve can be opened to allow air to flow from a higher pressure in one of the chambers to a lower pressure in the other of the chambers, the valve being located in parallel with the two way compressor arrangement.

7. The system of claim 5, wherein:
   the storage chamber and the inflation chamber define a closed air storage system wherein operating pressure in the inflation chamber can be increased without adding air to the closed air storage system and decreased without discharging air from the closed air storage system.

8. The system of claim 1, wherein:
   the storage chamber is located inside the tire cavity.

9. The system of claim 1, wherein
   the divider wall is substantially rigid so that volumes of the storage chamber and the inflation chamber remain substantially constant with changing operating pressure in the inflation chamber.

10. The system of claim 1, wherein:
    the compressor arrangement is mounted on the divider wall.

11. The system of claim 1, wherein:
    the compressor arrangement is carried by the wheel outside of the cavity of the tire.

12. The system of claim 1, further comprising:
    at least one additional wheel and tire assembly including an additional inflation chamber and storage chamber, and an additional compressor arrangement communicated with the additional inflation chamber and the additional storage chamber, each compressor arrangement being independently operable to control inflation of its respective wheel and tire assembly.

13. The system of claim 12, further comprising:
    a controller configured to repeatedly change the operating pressure in the inflation chamber between a lower inflation pressure and a higher inflation pressure by transfer of air between the storage chamber and the inflation chamber.

14. The system of claim 1, wherein:
    the divider wall comprises one or more plies of rubber coated parallel cords.

15. The system of claim 1, wherein:
    the divider wall comprises a plurality plies of rubber coated parallel cords laid together; and the respective rubber coated parallel cords of adjacent layers of the plurality of plies are oriented in alternate directions.

16. An onboard inflation system for a vehicle having a plurality of wheels and tires, each of the tires being mounted on one of the wheels to define a plurality of wheel and tire assemblies, the inflation system comprising:
  each of the tires including first and second sidewalls extending from its respective wheel, a tread portion, and a tire cavity including an inflation chamber adjacent the tread portion of the tire between the first and second sidewalls;
  a plurality of storage chambers, each storage chamber being carried by either the wheel or the tire of a respective one of the wheel and tire assemblies;
  a plurality of divider walls, each divider wall separating the inflation chamber from the storage chamber of each respective wheel and tire assembly, each divider wall extending between the first and second sidewalls of the tire such that the divider interfaces with the first and second sidewalls of each of the respective wheel and tire assemblies; and
  a plurality of compressors, each of the compressors communicating the storage chamber of a respective one of the wheel and tire assemblies with the inflation chamber of the respective one of the wheel and tire assemblies, each compressor configured to pump air between its respective storage chamber and its respective inflation chamber so that operating pressure in the inflation chamber can be changed by operation of the compressor.

17. The system of claim 16, wherein:
each of the compressors is configured to transfer air from its respective inflation chamber to its respective storage chamber so that operating pressure in its respective inflation chamber can be decreased by operation of the compressor.

18. The system of claim 17, further comprising:
a plurality of valves, each of the valves being associated with one of the wheel and tire assemblies and communicated with the storage chamber and the inflation chamber of its associated wheel and tire assembly, so that the valve can be opened to allow air to flow from the associated storage chamber to the associated inflation chamber, the valve being located in parallel with the compressor of its associated wheel and tire assembly.

19. The system of claim 17, wherein:
the storage chamber and the inflation chamber of each wheel and tire assembly define a closed air storage system wherein operating pressure in the inflation chamber can be increased without adding air to the closed air storage system and decreased without discharging air from the closed air storage system.

20. The system of claim 16, wherein:
each of the compressors is a two way compressor configured to pump air from its respective storage chamber to its respective inflation chamber so that operating pressure in the inflation chamber can be increased by operation of the compressor, and to pump air from its respective inflation chamber to its respective storage chamber so that operating pressure in the inflation chamber can be decreased by operation of the compressor.

21. The system of claim 20, further comprising:
a plurality of valves, each valve being communicated with the storage chamber and the inflation chamber of an associated one of the wheel and tire assemblies, so that each valve can be opened to allow air to flow from a higher pressure in one of the associated chambers to a lower pressure in the other of the associated chambers, each valve being located in parallel with its associated compressor.

22. The system of claim 16, wherein:
each storage chamber is located inside the tire cavity of the associated wheel and tire assembly.

23. The system of claim 16, wherein
each divider wall is substantially rigid so that volumes of the associated storage chamber and inflation chamber remain substantially constant with changing operating pressure in the inflation chamber.

24. The system of claim 16, wherein:
each compressor is mounted on its associated divider wall.

25. The system of claim 16, wherein:
each compressor is carried by its associated wheel outside of the cavity of its associated tire.

26. The system of claim 16, wherein:
the storage chamber and the inflation chamber of each wheel and tire assembly define a closed air storage system wherein operating pressure in the inflation chamber can be increased without adding air to the closed air storage system and decreased without discharging air from the closed air storage system.

27. The system of claim 26, further comprising:
a controller configured to selectively control each of the compressors to repeatedly change the operating pressure in each of the inflation chambers between a lower inflation pressure and a higher inflation pressure by transfer of air within each of the closed air systems between the associated storage and inflation chambers.

28. A method of controlling inflation pressures of a plurality of tires mounted on a plurality of wheels of a vehicle, each of the tires being mounted on one of the wheels to define a plurality of wheel and tire assemblies, the method comprising:
  (a) providing each of the wheel and tire assemblies with a separate inflation system including an inflation chamber operatively located adjacent a tread portion of the tire, a storage chamber, a compressor communicating the storage chamber with the inflation chamber, and a valve communicated with the associated storage chamber and the associated inflation chamber, the valve being located in parallel with the associated compressor;
  (b) providing each of the inflation chambers with an initial inflation pressure greater than atmospheric pressure, and providing each of the storage chambers with an initial stored air pressure greater than atmospheric pressure; and
  (c) selectively operating at least one of the valves until pressure within both its associated chambers is at an equilibrium pressure, and then selectively operating the associated compressor to further increase pressure in one of its associated chambers beginning at the equilibrium pressure by pumping air from the other of its associated chambers.

29. The method of claim 28, wherein:
in step (c) pressure is increased in the associated storage chamber by pumping air from the associated inflation chamber.

30. The method of claim 28, wherein:

in step (c) pressure is increased in the associated inflation chamber by pumping air from the associated storage chamber.

31. The method of claim 28, wherein:

in step (a) the storage chamber and the inflation chamber of each wheel and tire assembly define a closed air storage system; and further comprising:

selectively performing steps of:

increasing operating pressure in a selected one of the inflation chambers without adding air to the associated closed air storage system; and decreasing operating pressure in the selected one of the inflation chambers without discharging air from the associated closed air storage system.

32. The method of claim 28, wherein:

step (c) is performed by an automatic controller in response to an operator input.

* * * * *